(12) United States Patent
Fontana et al.

(10) Patent No.: US 10,280,310 B2
(45) Date of Patent: May 7, 2019

(54) OPTICAL APPLICATIONS OF NANOSPHERE METASURFACES

(71) Applicant: The United States of America, as represented by the Secretary of the Navy, Washington, DC (US)

(72) Inventors: Jake Fontana, Alexandria, VA (US); Jawad Naciri, Arlington, VA (US); Banahalli R. Ratna, Alexandria, VA (US); Nicholas A. Charipar, Alexandria, VA (US); Alberto Piqué, Crofton, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 175 days.

(21) Appl. No.: 15/657,623

(22) Filed: Jul. 24, 2017

(65) Prior Publication Data
US 2018/0030278 A1    Feb. 1, 2018

Related U.S. Application Data

(60) Continuation-in-part of application No. 14/881,435, filed on Oct. 13, 2015, now abandoned, which is a
(Continued)

(51) Int. Cl.
*B82Y 20/00* (2011.01)
*B82Y 30/00* (2011.01)
(Continued)

(52) U.S. Cl.
CPC .............. *C09D 1/00* (2013.01); *B22F 1/0018* (2013.01); *B22F 1/0025* (2013.01);
(Continued)

(58) Field of Classification Search
None
See application file for complete search history.

(56) References Cited

U.S. PATENT DOCUMENTS 9,450,310 B2 *  9/2016  Bily .................... H01Q 13/28
2006/0209300 A1  9/2006  Kamins et al.
(Continued)

OTHER PUBLICATIONS

"Picosecond all-optical switching in hydrogenated amorphous silicon microring resonators". Jason S. Pelc et al. (Year: 2014).*
(Continued)

*Primary Examiner* — Melvin C. Mayes
*Assistant Examiner* — Collette B Nguyen
(74) *Attorney, Agent, or Firm* — US Naval Research Laboratory; Roy Roberts

(57) ABSTRACT

A monolayer film of nanoparticles can formed from a fluid mixture by combining nanoparticles dispersed in water with a water-miscible organic solvent and a molecular ligand comprising a head group with affinity for the nanoparticle, and introducing the fluid mixture to a substrate in the presence of an air/fluid interface, thereby causing a monolayer film of nanoparticles to form on the substrate. Such monolayers films can include metallic nanoparticles such as gold, and possess substantially uniform spacing over at least a one centimeter length scale. The films are metasurfaces effective to cause a range of linear refractive index of from around unity at 700 nm to 10 at 1500 nm. Such metasurfaces might find utility, for example, as ultrafast (picosecond scale) switches at wavelengths useful for telecommunications.

12 Claims, 9 Drawing Sheets

Related U.S. Application Data division of application No. 13/771,551, filed on Feb. 20, 2013, now Pat. No. 9,321,920.

(60) Provisional application No. 61/601,305, filed on Feb. 21, 2012.

(51) Int. Cl.
    *C09D 1/00*      (2006.01)
    *B22F 7/04*      (2006.01)
    *B22F 7/08*      (2006.01)
    *B22F 1/00*      (2006.01)

(52) U.S. Cl.
CPC .............. *B22F 1/0062* (2013.01); *B22F 7/04* (2013.01); *B22F 7/08* (2013.01); *B82Y 30/00* (2013.01); *B22F 2007/042* (2013.01); *B22F 2301/255* (2013.01); *B82Y 20/00* (2013.01); *Y10T 156/11* (2015.01)

(56) References Cited

U.S. PATENT DOCUMENTS

| | | | | |
|---|---|---|---|---|
| 2014/0358128 | A1* | 12/2014 | Montazeri | H01L 31/054 604/890.1 |
| 2015/0116721 | A1* | 4/2015 | Kats | G01J 3/26 356/454 |

OTHER PUBLICATIONS

L. H. Acioli, A. S. L. Gomes, C. B. de Araujo, "All-optical gate with picosecond response in semiconductor-doped glasses", Electron. Lett., vol. 25, pp. 720-722, 1989.

V. Eckhouse, I. Cestier, G. Eisenstein, S. Combrié, G. Lehoucq, and A. De Rossi, "Kerr-induced all-optical switching in a GaInP photonic crystal Fabry-Perot resonator," Opt. Express 20, 8524-8534 (2012).

Jason S. Pelc, Kelley Rivoire, Sonny Vo, Charles Santori, David A. Fattal, and Raymond G. Beausoleil, "Picosecond all-optical switching in hydrogenated amorphous silicon microring resonators," Opt. Express 22, 3797-3810 (2014).

Wataru Yoshiki and Takasumi Tanabe, "All-optical switching using Kerr effect in a silica toroid microcavity," Opt. Express 22, 24332-24341 (2014).

\* cited by examiner

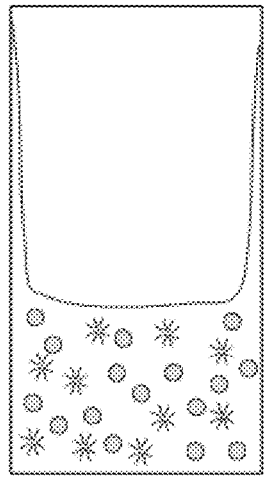 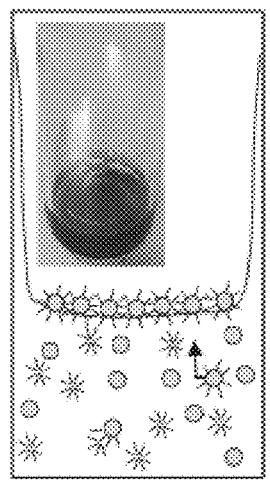 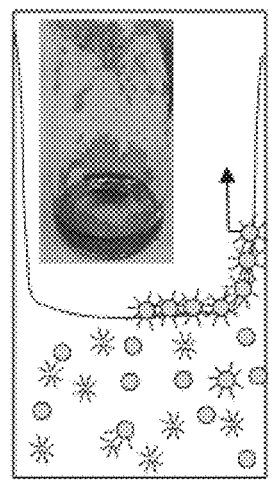
FIG. 1A    FIG. 1B    FIG. 1C
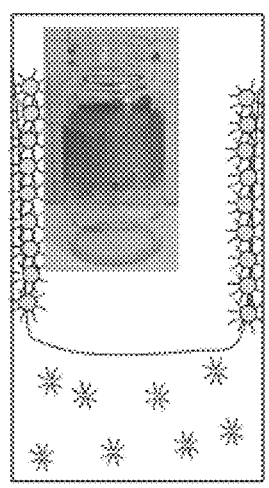 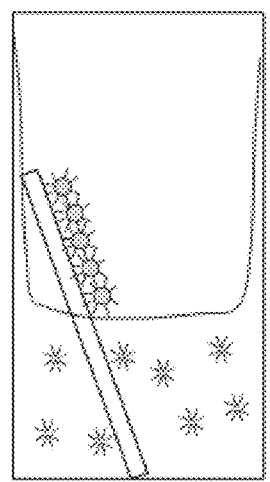 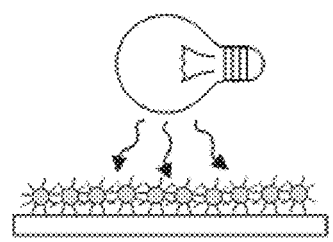
FIG. 1F
FIG. 1D    FIG. 1E
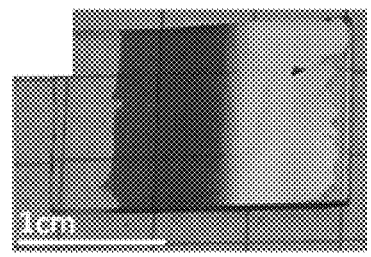
FIG. 1G

OPTICAL APPLICATIONS OF NANOSPHERE METASURFACES

CROSS-REFERENCE TO RELATED APPLICATIONS

This application claims the benefit as a Continuation in Part of U.S. patent application Ser. No. 14/881,435 filed on Oct. 13, 2015, now abandoned, which in turn claims the benefit as a divisional of U.S. patent application Ser. No. 13/771,551 filed on Feb. 20, 2013, now U.S. Pat. No. 9,321,920, which in turn claims the benefit of U.S. Provisional Application 61/601,305 filed on Feb. 21, 2012, the entirety of each of which is incorporated herein by reference.

STATEMENT REGARDING PRIOR DISCLOSURES BY THE INVENTORS

A prior disclosure, "Linear and nonlinear optical characterization of self-assembled, large-area gold nanosphere metasurfaces with sub-nanometer gaps," *Optics Express* 24(24):27360-27370 (November 2016) was made by one or more of the inventors with other named authors. With regard to the presently-claimed subject matter, those other authors who are not named as inventors of this patent application were working under the direction and supervision of at least one of the inventors.

BACKGROUND

Metamaterials are a large class of engineered materials. Metamaterial properties are determined from the organization of the constituents. Current metamaterial research is focused on novel optical devices, for example, flat sub-wavelength resolution macroscopic lenses (see refs. 1-5) and transformational optics (see refs. 3, 6-8). Top-down lithographic techniques (see refs. 9-12) have, in general, been used to create nanostructured metamaterials. Typically the processes are complex, time consuming, expensive, producing primarily 2D fixed structures with limited particle resolution. Another strategy to generate nanostructured metamaterials is bottom-up or self-assembly, but this has proved challenging, both from a fundamental and production approach, over the last decade (see refs. 13, 14). If an efficient self-assembly process can be realized to organize nanometer size constituents into macroscopic homogenized materials, then practical metamaterial devices may become possible.

Other investigators have suspended metallic nanoparticles in fluids for the purpose of making films. Deng (see ref. 15) developed a method for making nanoparticle films at the air-fluid interface and dip-coated a substrate into the suspension to remove the nanoparticles from the interface. However, the nanospheres were not packed efficiently in any positional order, the size of domains transferred onto the substrate was only submicron in size, the nanospheres were not capable of being phase transferred, the mechanism for the nanosphere aggregating at the air-fluid interface was not presented and the film had to be transferred onto required substrates. Jaeger (see ref. 16) evaporated sessile droplets of gold nanospheres and ligands in organic suspension. They achieved macroscopic, self-assembled, monolayer domains of gold nanospheres at the air-liquid interface, but the nanoparticles were only gold nanospheres, could not be transferred to other substrates and could not be crosslinked together to form a film. Sastry (see ref 17) observed thin films of gold nanospheres confined between a liquid-liquid interface translate up a glass vial via Marangoni flow (see ref. 18). Spain (see ref. 19) observed silver nanospheres suspended in excess ligand and two immiscible fluids translate up the walls of a vial using Marangoni flow. Both Sastry and Spain required a liquid-liquid interface, the nanoparticles were only nanospheres and the films were not high-density crosslinked monolayers. Sastry (see ref. 20) also crosslinked gold nanosphere films at the liquid-liquid interface with benzene and anthracene, but the crosslinking was not controllable and only micron-size domains were presented. Hoyle (see ref. 21) claimed trithiol functionalized gold nanoaggregates dispersed in thiol-ene films; however, the nanoparticle density was very dilute (0-1 wt %).

A need exists for techniques effective in creating a continuous, uniform, and tightly-packed monolayer of nanoparticles, particularly at larger scales.

BRIEF SUMMARY

In one embodiment, a method of optical switching includes passing a pump light and a probe light through at least one polarization controller and thence through one or more metasurfaces; and modulating the pump light at a time scale on the order of picoseconds or shorter, thereby causing the intensity of probe light passing through the metasurface to be switched at the same time scale, wherein each metasurface is a monolayer film comprising metallic nanoparticles having substantially uniform spacing over at least a one centimeter length scale.

Another embodiment is an optical switch including a first input port configured to admit pump light; a second input port configured to admit probe light; at least one polarization controller configured to receive the pump and probe light from the input ports; at least one metasurface in the form of a monolayer film comprising metallic nanoparticles having substantially uniform spacing over at least a one centimeter length scale, configured to receive light from the polarization controller; and an output port configured to receive light from the metasurface.

Additional details regarding various aspects of this technology are contained in the publication of J. Fontana et al., *Adv. Optical Mater.* 2013, 1, 100-106 and its accompanying Supporting Information, along with "Linear and nonlinear optical characterization of self-assembled, large-area gold nanosphere metasurfaces with sub-nanometer gaps," *Optics Express* 24(24):27360-27370 (November 2016), all of which is incorporated herein by reference.

BRIEF DESCRIPTION OF THE DRAWINGS

FIG. 1a schematically illustrates a vial containing an emulsion of metallic nanoparticles, ligands, tetrahydrofuran and water. FIG. 1b depicts phase separation and metallic nanoparticle film formation, with the inset image showing initial gold nanosphere film formation. FIG. 1c shows metallic nanoparticle film transport using surface tension gradients, with the inset image showing gold films translating up the sides of the vial. FIG. 1d shows the end of the phase transfer and transport process, where nearly all nanoparticles have been removed from the suspension, while the inset image shows gold nanosphere films attached to the sides of the vial. FIG. 1e depicts a simple method to transport the nanoparticle films onto a substrate. FIG. 1f shows schematically the exposure of UV-light to the film, initiating the click reaction (e.g., thiol-ene or thiol-yne) and crosslinking the films. FIG. 1g shows a gold nanosphere-crosslinked film on a glass substrate is partially transmitting light (left side), demonstrating preservation of the plasmon resonances, optical clarity and reflecting light (right side), demonstrating a high volume fraction of nanoparticles.

FIGS. 4a through 4d show crosslinked centimeter size monolayer domains of thiol-ene functionalized 17 nm gold nanospheres films heavily washed with chloroform after film deposition. FIGS. 4e through 4f show uncrosslinked thiol-ene functionalized 40 nm gold nanospheres films gently washed with chloroform after film deposition.

DETAILED DESCRIPTION

Definitions

Figure 2A:
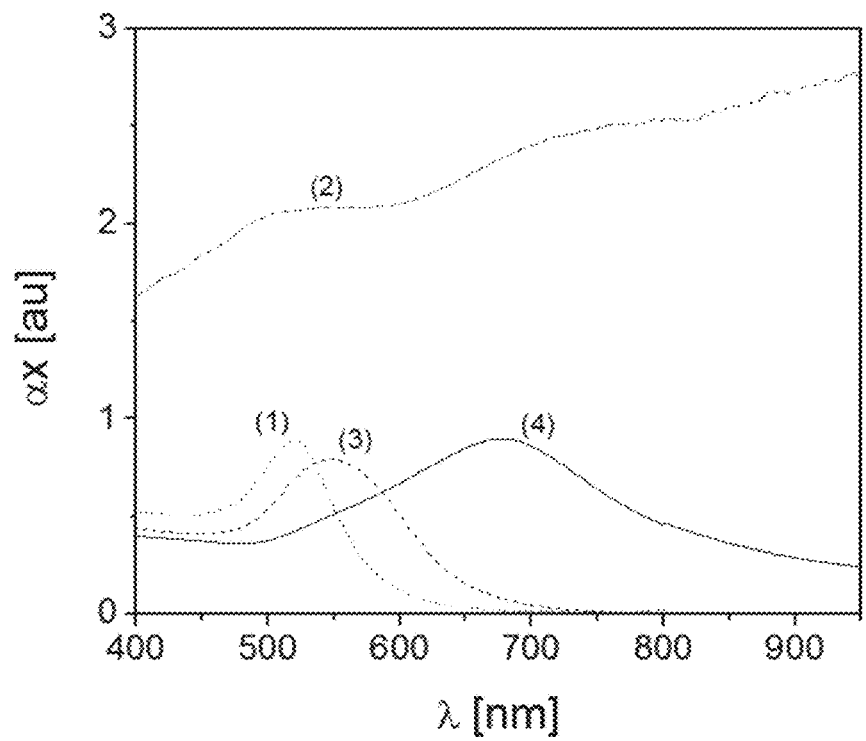
FIG. 2a shows absorbance spectra for 17 nm gold nanospheres suspended in water (1: dotted line), the nanoparticle-water-THF-ligand emulsion immediately after mixing all the constituents (2: dash-dot-dot line), the nanospheres resuspended in chloroform after phase transferring (3: dashed line) and in a crosslinked film on a glass substrate (4: solid line).

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used in this specification and the appended claims, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

As used herein, the term "nanoparticle" refers to a particle having a largest dimension of no greater than 100 nanometers.

Description

Described herein is a simple, fast, inexpensive, efficient and scalable process that functionalizes and self-assembles nanoparticles into macroscopic monolayer films using phase separation, transporting the films onto the desired substrate using surface tension gradients.

The self-assembly process can be schematically represented in FIGS. 1a to 1g. There are three primary constituents in this system: nanoparticles dispersed in water (such as metallic nanoparticles suspended using an ionic surfactant), a water-miscible organic solvent such as tetrahydrofuran (THF), and molecular ligands. Macroscopic, self-assembled metallic nanoparticle monolayer films were produced by first placing aqueous suspended nanoparticles into a glass vial. Thiol-containing molecular ligands, such as thiol-ene and thiol-alkane, were suspended in THF at a concentration sufficient to cover at least the entire surface area of the nanoparticles. The ligand-THF solution was added to the aqueous nanoparticle suspension and mixed. The reaction leads to an emulsion of metallic nanoparticles, ligands, THF, and water, as seen in FIG. 1a. Water and THF are miscible, the introduction of the thiol-ligands into the solution, with one end of the ligand more hydrophobic than the other, causes a phase separation and the solution to scatter light. The thiol-ligands then quickly begin to graft to the nanoparticles in suspension, facilitating phase transfer of the nanoparticles to become hydrophobic. The higher vapor pressure and lower density of THF, relative to water, causes the THF to move towards the air-fluid interface, carrying the phase-transferred nanoparticles to the air-fluid interface, as seen in FIG. 1b. Within seconds after mixing, films of metallic nanoparticles begin to form at the air-fluid interface, eventually covering the entire surface of the interface.

The vigorous shaking also leads to wetting of the solution on the sides of the vial, leaving behind a thin film of solution. The increased surface-to-volume ratio in the thin film of solution on the side of the vial and the differences in vapor pressures between solvent (such as THF) and water lead to a relative reduction of solvent in the thin film, or a concentration gradient, between the thin film and bulk solutions. The concentration gradient of THF causes a surface tension gradient, i.e. a pressure difference, between the thin film and bulk solutions which in turn causes fluid to flow from the low to high surface tension areas (Marangoni flow) (see refs. 16, 18, 24, 25). The fluid flow induced by the surface tension gradient carries the metallic nanoparticle films up the sides of the vial, as seen in FIG. 1c. The nanoparticle film formation and transport continues until nearly all the nanoparticles have been removed from the suspension, as seen in FIG. 1d.

The nanoparticle films can be transferred onto a substrate by, for example, placing the substrate, such as glass or silicon, into the vial prior to shaking, as seen in FIG. 1a. After shaking, the metallic nanoparticle films translate up the substrates similarly to the sides of the glass vial, as seen in FIG. 1e.

Figure 7A:
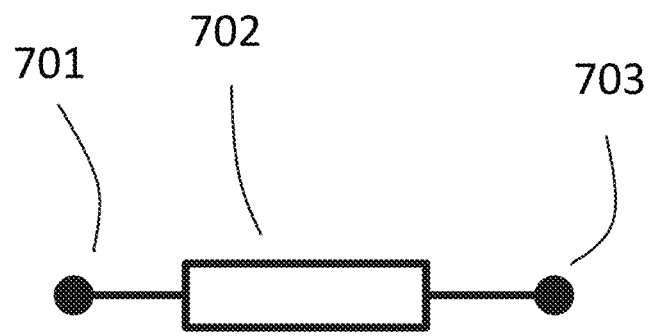
FIG. 7a is a schematic illustration of a molecular ligand as described herein.
Figure 7B:
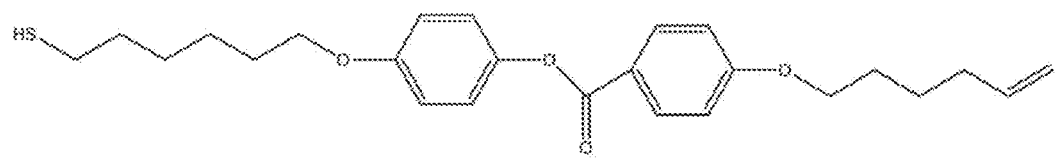
FIGS. 7b and 7c show the exemplary molecular ligands SC6V and SC6S, respectively.
Figure 7C:

FIG. 7a schematically illustrates an exemplary molecular ligand. A head group 701 has an affinity for the nanoparticle and can be, for example, thiol, isocyanide, or phosphine. An optional linker 702 can be rigid (such as an aromatic group)

or flexible, such as an alkane. A tail group 703 is preferably incorporated and provides further functionality such allowing for chemical crosslinking (e.g., via click chemistry), conjugation to other molecules for added functionality, or optionally may provide nanoparticle binding affinity as does the head group 701. Exemplary tail groups include terminal alkene or alkyne, carboxylic acid, and amine. The molecular ligand can be conducting or nonconducting. Multiple types of molecular ligand may be employed in a single film-forming reaction. The exemplary molecular ligands SC6V and SC6S are depicted in FIGS. 7b and 7c, respectively.

Advantages and New Features

The described process provides a simple, fast, inexpensive, efficient and scalable process to self-assembled, high-density (e.g., with consistent edge-to-edge spacing of less than one particle diameter), centimeter-size domains of functionalized metallic nanoparticle monolayer films. It allows for phase transferring nanoparticles simply and efficiently and recovering nearly all nanoparticles from the initial suspension. The process allows for the phase transfer and transport of metallic nanoparticles of various sizes, shapes and compositions, and is believed to be operable on non-metallic nanoparticles. The process of phase transfer and film transport is possible using a wide variety of ligands such as thiol-y/ene and thiol-alkane. If the nanoparticles are functionalized with thiol-y/ene ligands a wide variety of molecules and/or nanoparticles may be attached to the nanoparticles using click chemistry. Very little support equipment is required, relative to top-down techniques, making the process relatively inexpensive. The process is scalable to orders of magnitude larger substrates. It allows for nearly perfect hexagonal packing of nanospheres for monolayer films with centimeter dimensions while preserving the plasmon resonances.

Functionalization of nanoparticles, modified for click chemistry, enable the nanoparticles to translate and reconfigure prior to crosslinking. The functionalized nanoparticles modified for click chemistry allow for straightforward crosslinking of the nanoparticles into high-density films, possibly without a substrate and with no need for a host material to disperse and/or support the final nanoparticle structure.

The process allows for multiple monolayer films to be built into three-dimensional structures by repeating the deposition cycle, not necessarily with the same nanoparticles, orientation, position or dimensions for each layer.

Variations

Functional ligands, such as dyes and liquid crystal molecules, may be used to tune the optical and mechanical properties of the films. Other water-miscible organic solvents (singly or in combination) may be used in place of the THF and/or the water used in the examples. Suitable solvents may include, for example, 2-methyltetrahydrofuran, acetone, methanol, DMSO, and acetonitrile. Ridged, flexible, rigid, flat, curved, patterned or composite substrates may be used to position and orient the films. The substrates may be modified with a variety of surface chemistries. The films may be free-standing without the need for a substrate.

Surfactants and/or ligands may be used to change the surface tension at the air-fluid interface to control orientational and/or positional order of the nanoparticles (for example, rod-shaped nanoparticles could be oriented on end or flat). Electric and magnetic fields may be used to assist the positional and orientational order of the nanoparticle assemblies. The process of monolayer formation may also be regulated by the application of pressure or optical or other electromagnetic radiation (e.g. at wavelengths effective to manipulate the nanoparticles).

This technique is applicable to nanoparticles of a variety of compositions and geometries. The technique is expected to operate on other types of nanoparticles beyond the metallic particles tested, including those of polymeric composition, or composed of semiconductors, biomolecules (including viruses and modified versions thereof), inorganic and organic materials, and combinations thereof. The technique is expected to operate with a wide variety of nanoparticle geometries/shapes in addition to the spherical and rod-shaped particles tested.

The process may be used to filter different size, shape or materials particles.

Monolayer films prepared as described may be useful as substrates for surface-enhanced Raman scattering (SERS).

Moreover, as noted below, it was found that such nanoparticles films, or metasurfaces, exhibit optical behavior with possible application as optical switches or gates, particular at wavelengths on the order of 1500 nm, desirable for use in telecommunications.

EXAMPLES

Example 1. Phase Transfer of Gold Nanospheres

Typically, 1 ml of concentrated aqueous nanosphere suspension (e.g. 17 nm Nanopartz Accurate Spherical Gold Nanoparticles, citrate-stabilized, volume fraction=$10^{-5}$) is placed in a 20 ml borosilicate glass vial. In a separate 5 ml borosilicate glass vial, typically 5 mg of SC6V (FIG. 7b) (see J. Lub et al, Liebigs Ann. Red., 1997, 2281, incorporated herein by reference) is dissolved in 1 ml of tetrahydrofuran (THF). The SC6V-THF solution is added to the aqueous nanoparticle suspension and the mixture is vigorously shaken for 30 s. Gold nanosphere films then form at the air-fluid interface and travel up the sides of the vial. After substantially all of the gold nanospheres were removed from the solution, FIG. 1d, the remaining solution at the bottom of the vial can be decanted and nitrogen is used to quickly evaporate any residual fluid. The side of the vial was washed with 1 ml of chloroform and sonicated for 60 seconds. The gold nanospheres were re-suspended in the organic solvent. FIG. 2a shows the absorbance for the initial suspension of 17 nm gold nanospheres suspended in water (dotted black line). FIG. 2a (dashed black line) is the absorbance for the nanosphere-ligand-THF-water emulsion measured immediately after mixing all the constituents together. FIG. 2a (solid black line) is the absorbance of the 17 nm gold nanospheres re-suspended in chloroform, with very little degradation to their plasmon resonances.

Example 2. Phase Transfer of Metallic Nanoparticles

Figure 2B:
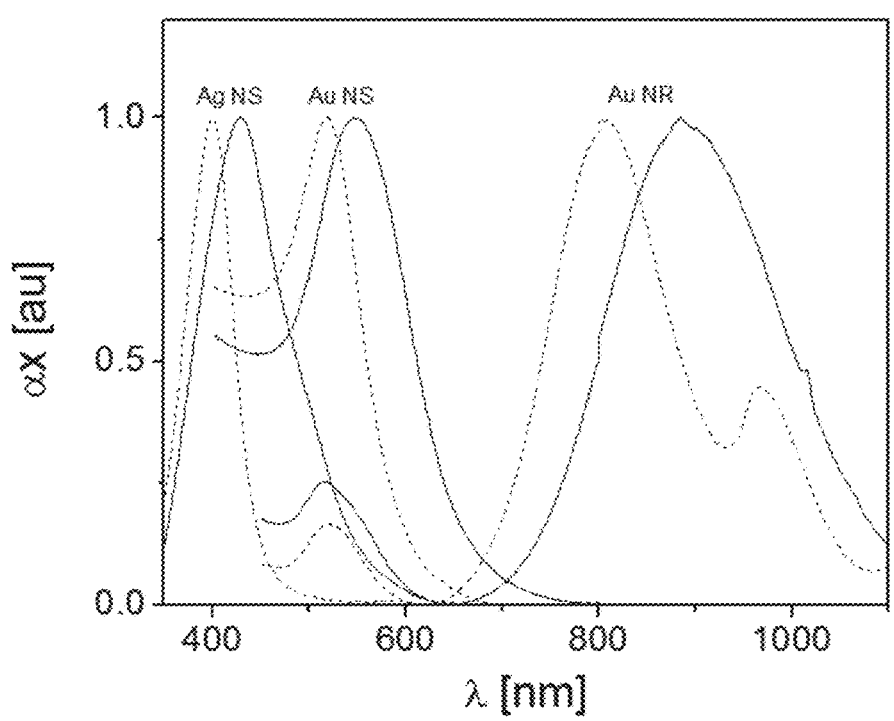
FIG. 2b shows normalized absorbance spectra for the phase transfer for 20 nm silver nanospheres (Ag NS), 10 nm gold nanospheres (Au NS) and 10×45 nm gold nanorods (Au NR) suspended in water (dotted line) to chloroform (solid line).

The process was also used for anisotropic nanoparticles such as gold nanorods, and silver nanospheres FIG. 2b, demonstrating metallic nanoparticles of different size, shape and composition worked well with this process. Gold nanospheres from Nanopartz, BBI international and SPI worked equally well regardless of the ionic surfactants.

Example 3. Transport of Gold Nanosphere Monolayer Films onto Substrates

Gold nanospheres were transported onto 12×25 mm glass and silicon substrates by adding the substrate to the vial prior to mixing, as in FIG. 1a. After shaking the gold nanosphere films translated up the substrates similarly to the sides of the glass vial, seen in FIG. 1e. If the substrate was hydrophobic, such as Teflon, then film transport onto the substrate would not occur, and the nanoparticles would be confined to the air-fluid interface.

The absorbance for the nanosphere film on a glass substrate, FIG. 1f (bottom), was measured with results shown in FIG. 2a (solid black line). From the absorbance the thickness of the films can be determined. If the nanospheres are assumed to be a hexagonally packed, the number density can be estimated to be $\rho=2.8\times10^{23}$ [NP/m$^3$]. The absorption cross-section was provided from calculations (Nanopartz, Inc.) to be $\sigma=9.0\times10^{-17}$ [m$^2$]. The film thickness was then calculated to be $x=\alpha x/\rho\sigma=18$ nm, demonstrating the films were only a monolayer thick on the glass substrates.

Example 4. Thiol-Ene Functionalized Gold Nanospheres into Crosslinked Monolayer Films Typically, 1 ml of concentrated aqueous nanosphere suspension (e.g. 17 nm Nanopartz Accurate Spherical Gold Nanoparticles, volume fraction=10$^{-5}$) is placed in a 20 ml borosilicate glass vial. In a separate 5 ml borosilicate glass vial, typically 5 mg of SC6V (FIG. 7b) is dissolved in 1 ml of tetrahydrofuran (THF), then 5 µl of SC6S (FIG. 7c) (1,6-hexanedithiol) is added to the vial. The SC6V-SC6S-THF solution is added to the aqueous nanoparticle suspension, and the mixture is vigorously shaken for 30 s. In one experiment described here, photoinitiator (1 wt %) was also added (e.g. Irgacure 369), although found not to be necessary given the intensity of the UV light source employed (Dymax Bluewave 200, $\lambda=280$-450 nm, I=40 W/cm$^2$).

Gold nanospheres films began to form at the air-fluid interface and then travel up the sides of the vial or substrate. Once the reaction was complete the nanoparticles were exposed to UV-light for several seconds crosslinking the nanoparticles together, via click chemistry (see ref. 22), FIG. 1f, into a solid film.

Example 5. Ligand Kinetics

Figure 3A:
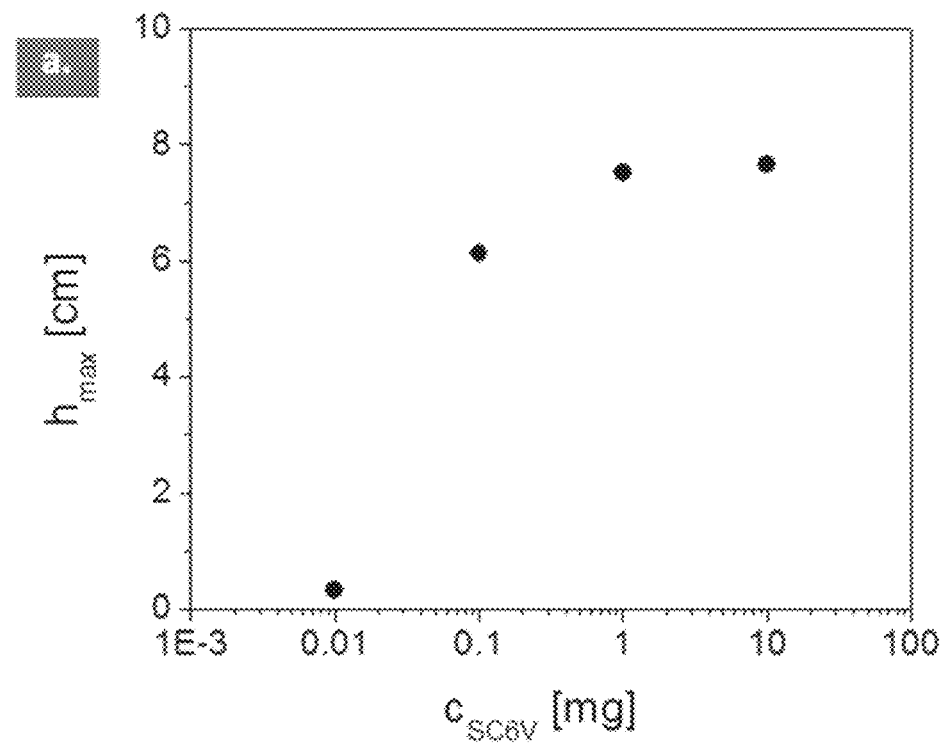
FIG. 3a shows the maximum height of 17 nm gold nanosphere films above the air-fluid interface as a function of SC6V concentration.

To understand the effects of the ligand concentration, the maximum height the nanosphere films travel up the side of the vial versus SC6V concentration was studied with the concentrations of gold nanospheres, THF and water held constant, as shown in FIG. 3a. If no ligands were added to the suspension or if dimethyl sulfoxide (vapor pressure=5×10$^{-3}$ kPa) was used in place of THF then the gold films did not form at the air-fluid interface nor did any gold translate up the sides of the vial. The mass of SC6V required to cover all the surface area of the gold nanospheres was estimated to be $m_{SC6V}=0.09$ mg ($\rho_{SC6V}=1.53\times10^3$ [kg/m$^3$]); this corresponds well to the experimentally observed increase in maximum film height in FIG. 3a between 0.01-0.1 mg of SC6V. If 40 nm gold nanospheres were used in place of the 17 nm nanospheres, the maximum height of the gold film up the side of the vial was approximately 4 cm. Although the film height was approximately constant for ligand concentrations above 1 mg of SC6V, the rate of the nanosphere film formation and size increased with increasing excess ligand concentration.

Figure 3B:
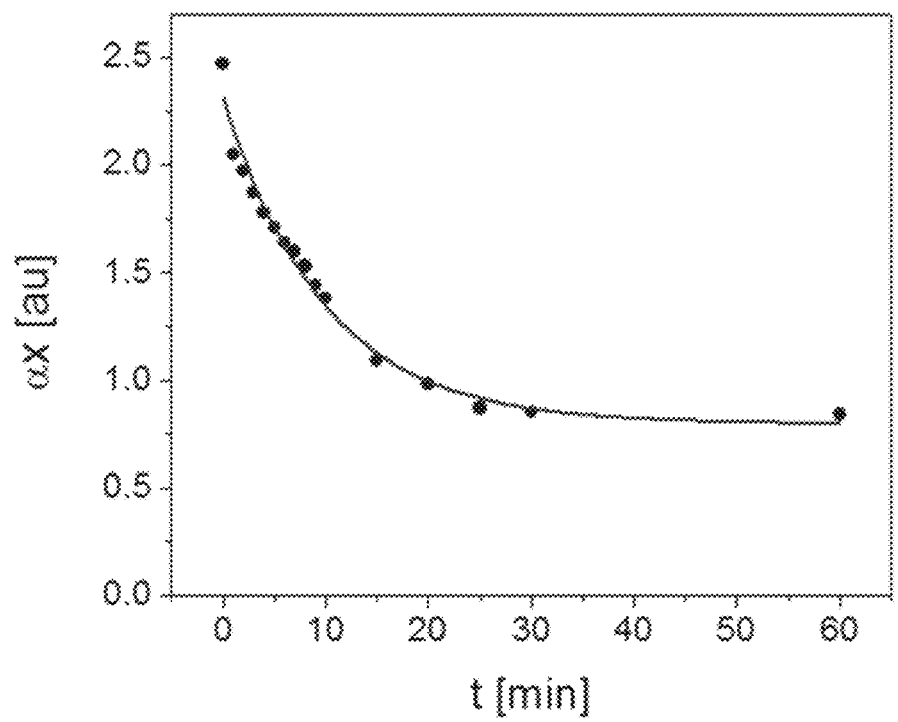
FIG. 3b shows the absorbance spectrum of 17 nm gold nanospheres, at the absorption peak maximum ($\lambda_{max}$=520 nm), remaining in suspension versus time.

To determine the rate of nanosphere removal from suspension, the absorbance was measured as a function of time with initial concentrations of SC6V (5 mg), 17 nm Au nanospheres (1 ml in water), THF (1 ml), FIG. 3b. An unpolarized white light (Oriel 68806, 50-200 W) and spectrometer (Oceanoptics Redtide USB650 spectrometer) were used to measure the absorbance of the suspension contained in a 10 mm path length quartz cuvette. Nearly all the nanospheres were removed from the suspension within one hour, as shown in FIG. 3b. The data in FIG. 3b fits well with an exponential function, $\alpha x=1.52e^{-0.10t}+0.76$ assuming the rate of evaporation is the primary mechanism for nanosphere removal and is exponential in form. The apparent absorbance, after the removal of the nanospheres, is due to scattering from the ligand clusters remaining in the solution.

Example 6. SEM Characterization

Gold nanospheres were functionalized with SC6V and SC6S ligands using the process described in Example 4 and transferred onto silicon wafer substrates, similarly to Example 3, to examine the microscopic structure using a scanning electron microscope, SEM (Carl Zeiss, Model 55). FIGS. 4a-d are SEM images of 17 nm thiol-ene functionalized gold nanospheres that were exposed to UV light for several seconds, crosslinking the films. Several milliliters of chloroform were forcibly sprayed onto the films using a pipette to remove any excess ligands. FIGS. 4a-d demonstrates robust, crosslinked monolayer films over centimeter-size domains. In contrast, if the films were not exposed to UV light they were easily washed away with organic solvents. FIGS. 4e-f are SEM images of 40 nm thiol-ene functionalized gold nanospheres that were not exposed to UV light therefore not crosslinked together. Several drops of chloroform where used to gently wash away any excess ligand; however even the gentle washing destroyed the hexagonally packed nanosphere monolayer film.

Example 7. Multi-Layered Gold Nanosphere Films

Figure 5:
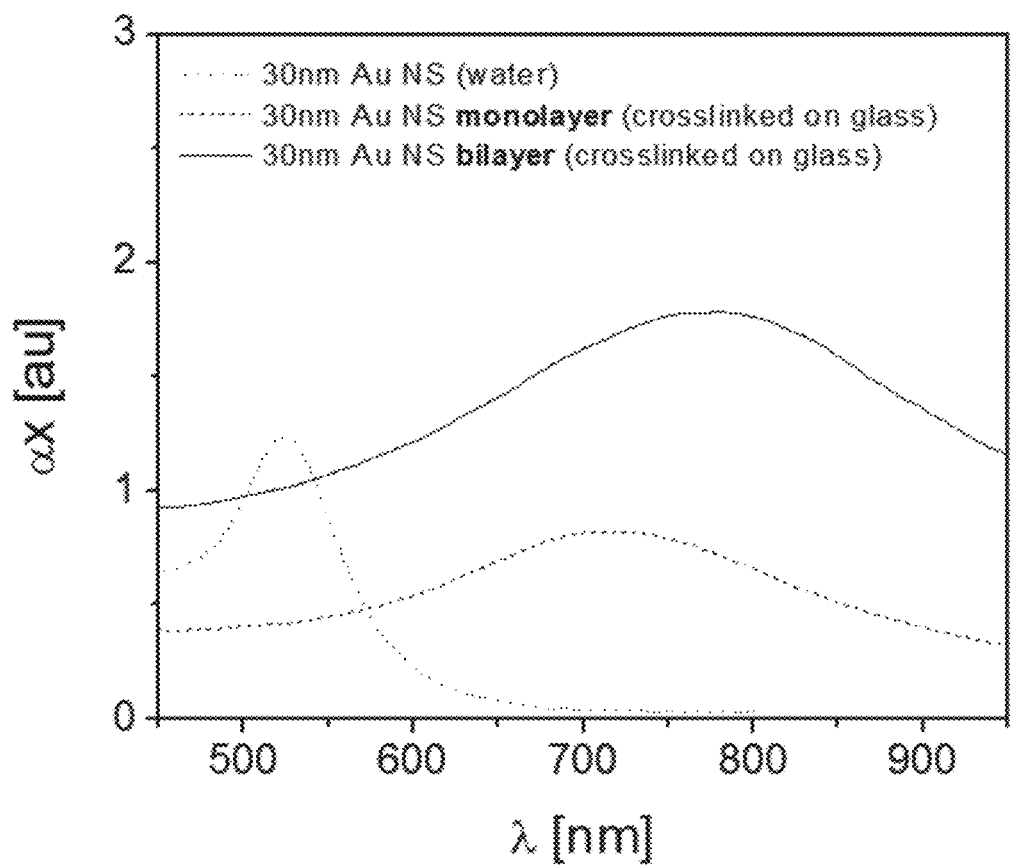
FIG. 5 shows absorbance spectra for 30 nm gold nanospheres, suspended in water (dotted black line), crosslinked monolayer film on a glass substrate (dashed black line) and crosslinked bilayer film on a glass substrate (dashed black line).

After one monolayer was transferred onto a glass substrate, as in FIG. 1e, the substrate was removed from the vial, held outside the vial for 30 s and then placed back into the vial. Another monolayer film was translated onto the initial monolayer, creating a bilayer film. The absorbance of the nanospheres in water, crosslinked into a monolayer film on a glass substrate, and crosslinked into a bilayer film on a glass substrate are shown in FIG. 5.

Figure 4A:
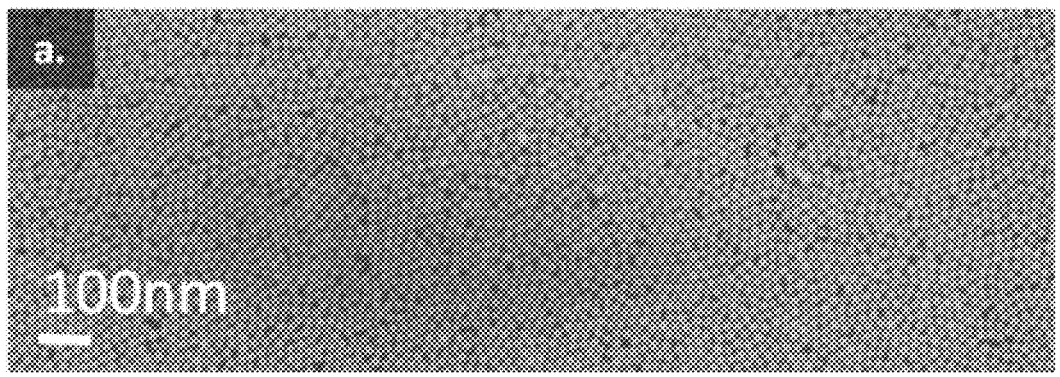
FIGS. 4a through 4f are scanning electron microscopy (SEM) images of gold nanospheres on silicon wafer substrates.
Figure 4B:
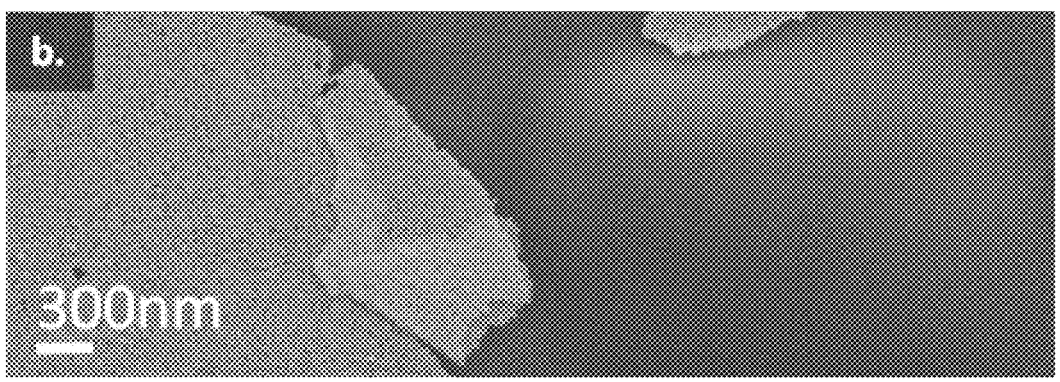
Figure 4C:
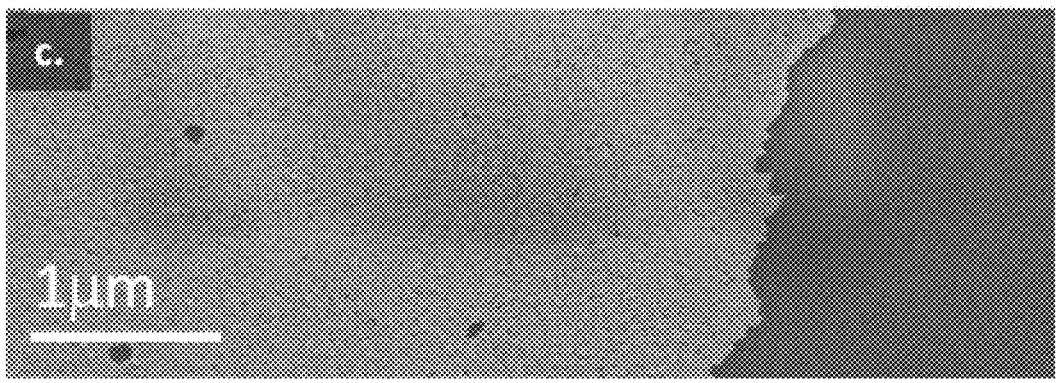
Figure 4D:
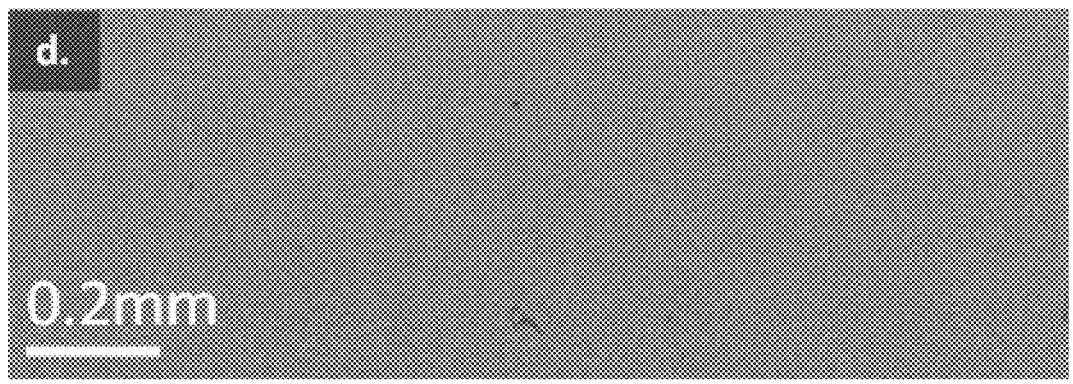
Figure 4E:
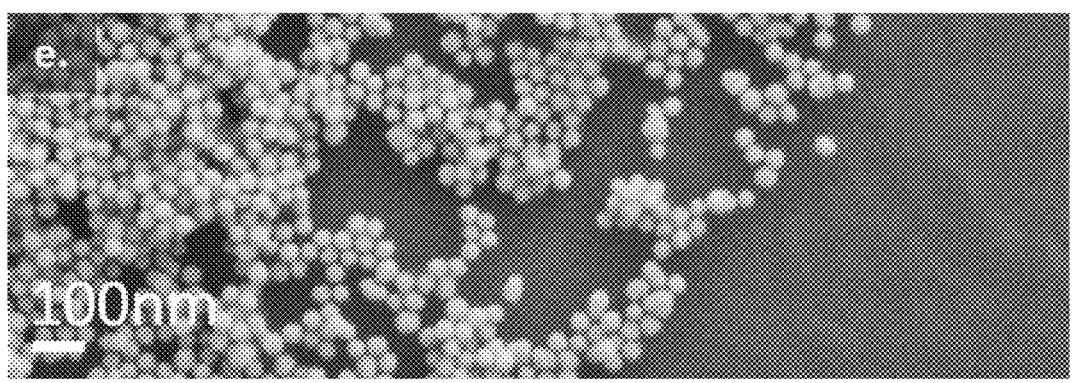
Figure 4F:
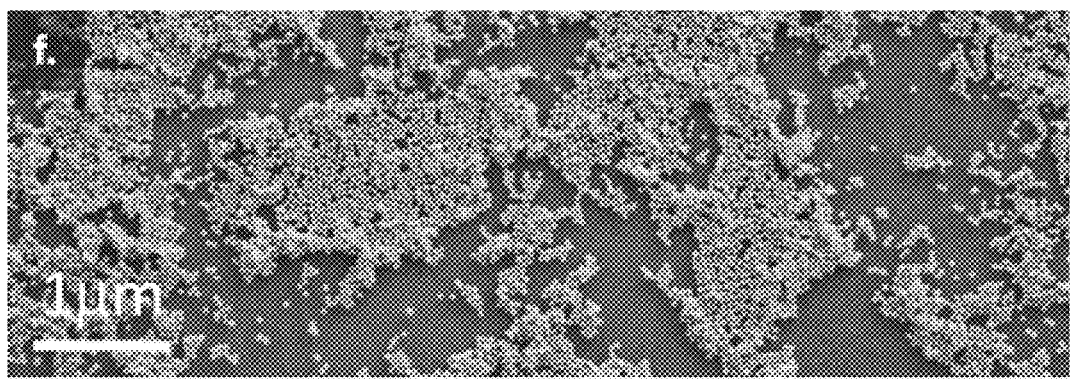

Although shifted due to particle-particle coupling, the plasmon resonances were preserved very well for the crosslinked monolayer film, as seen in FIG. 2a (solid black line), given the ultra-high-density of nanospheres, FIG. 4a, making this self-assembly process a promising candidate for the pragmatic assembly of metamaterials.

Figure 6:
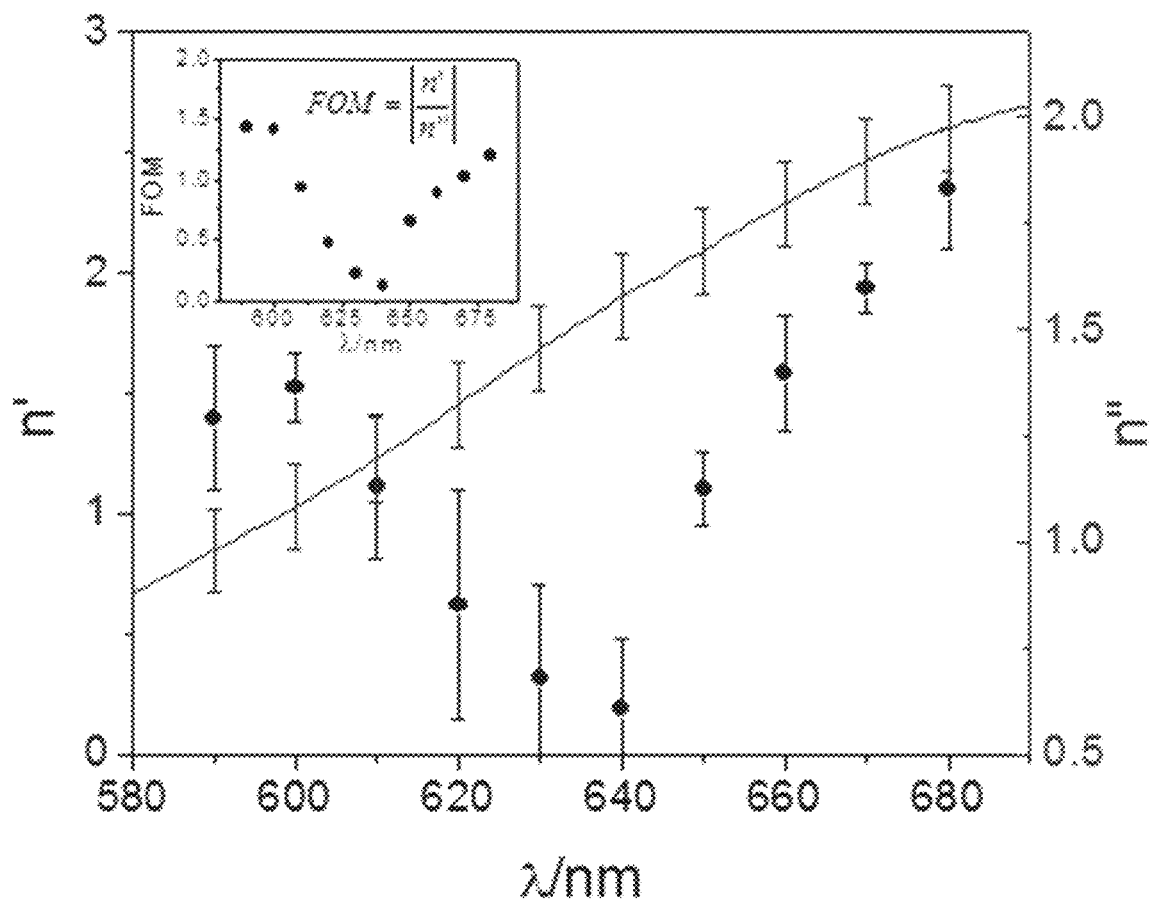
FIG. 6 shows the refractive index of a crosslinked 17 nm gold nanosphere monolayer film with real (dotted graph points, left Y-axis) and imaginary (non-dotted graph points, right Y-axis) refractive index as a function of wavelength. The inset is the figure of merit.

Example 8. Near-Zero Effective Refractive Index Metamaterials at Visible Frequencies The metamaterial comprises gold nanospheres self-assembled into crosslinked, monolayer films as described in Example 4. By measuring the real and imaginary parts of the phase shift of light transmitted through the films, using a Mach-Zehnder interferometer, the effective index of refraction was determined as a function of wavelength, as seen in FIG. 6. This demonstrate a self-assembled metamaterial exhibiting a positive near-zero index of refraction at visible wavelengths.

Optical Switching

Metasurfaces enable the ability to tailor optical properties of materials beyond those naturally occurring, by carefully controlling the shape, composition and degree of order of the plasmonic nanoparticle elements. For natural transparent materials the linear index of refraction is typically limited to greater than 1 and less than ~2.5 at visible and near infrared wavelengths, thus limiting potential applications.

As noted in "Linear and nonlinear optical characterization of self-assembled, large-area gold nanosphere metasurfaces with sub-nanometer gaps," *Optics Express* 24(24):27360-27370 (November 2016), the metasurfaces described herein have interesting optical properties. In particular, it was surprisingly found that the real to imaginary part of the refractive index jumps from around unity at 700 nm to 10 at 1500 nm.

Figure 8A:
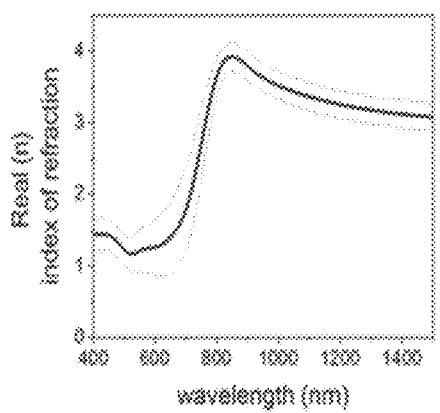
FIGS. 8a and 8b show the effective linear real (n) and imaginary (k) parts of the refractive index of the metasurface, respectively, as determined using spectroscopic ellipsometry. The figure of merit (FOM), |n/k|, is shown in FIG. 8c.
Figure 8B:
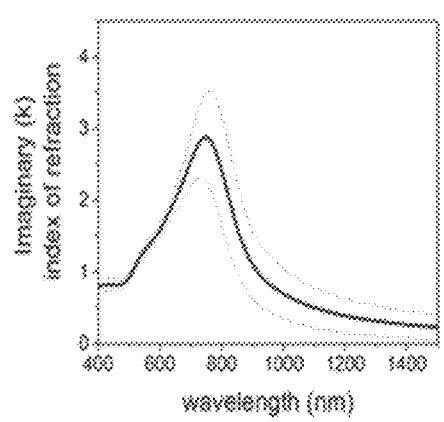
Figure 8C:
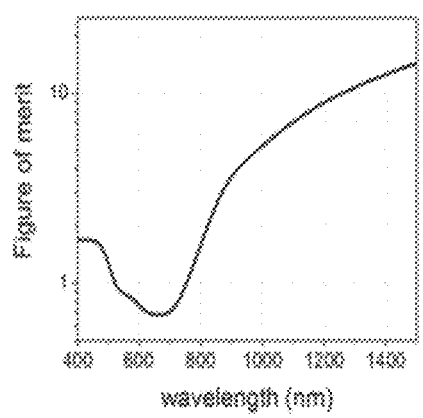

FIGS. 8a and 8b show the effective linear real (n) and imaginary (k) parts of the refractive index of the metasurface, respectively, as determined using spectroscopic ellipsometry. The solid lines are the optical response averaged over 5 metasurface samples and the dotted lines are the uncertainties in the measurements. The real part of the linear refractive index shows a large dispersion varying from less than vacuum, 0.87 at 625 nm, to larger than any natural transparent material, 4.1 at 848 nm. The figure of merit (FOM), |n/k|, is shown in FIG. 8c. At the resonance peak (747 nm) FOM=1.3, however moving further into near infrared wavelengths n remain large (>3) over a bandwidth of at least 700 nm, while k decreases significantly, yielding a FOM>10.

Fiber optic based telecommunications typically occur at 1550 nm. The unexpected large linear refractive index of this metamaterial at or around that wavelength indicates utility for use as ultrafast (picoseconds) optical switches for telecommunications.

All-optical switches are known in the art. Examples include those described in L. H. Acioli, et al., "All-optical gate with picosecond response in semiconductor-doped glasses", *Electron. Lett.*, vol. 25, pp. 720-722, 1989; V. Eckhouse, et al. "Kerr-induced all-optical switching in a GaInP photonic crystal Fabry-Perot resonator," Opt. Express 20, 8524-8534 (2012); J. Pelc et al., "Picosecond all-optical switching in hydrogenated amorphous silicon microring resonators," Opt. Express 22, 3797-3810 (2014); and W. Yoshiki and T. Tanabe, "All-optical switching using Kerr effect in a silica toroid microcavity," Opt. Express 22, 24332-24341 (2014). Each of these documents is incorporated herein by reference for the purposes of disclosing the construction and use of optical switches.

In this case, a method of all-optical switching is contemplated that involves a metasurface which is a monolayer film comprising metallic nanoparticles having substantially uniform spacing over at least a one centimeter length scale. By passing a pump light and a probe light through at least one polarization controller and thence through one or more metasurfaces and modulating the pump light, the intensity of probe light passing through the metasurface can be switched. Such a switch should be operable at the picosecond time scale if not faster.

Also contemplated is an apparatus for optical switching including a first input port configured to admit pump light; a second input port configured to admit probe light; at least one polarization controller configured to receive the pump and probe light from the input ports; at least one metasurface in the form of a monolayer film comprising metallic nanoparticles having substantially uniform spacing over at least a one centimeter length scale, configured to receive light from the polarization controller; and an output port configured to receive light from the metasurface.

In embodiments, the optical switch has pump light and probe light each pass through separate polarization controllers and then through a first wavelength division multiplexer before reaching the metasurface. Optionally, light passing through the metasurface then passes through a second wavelength division multiplexer. One of ordinary skill in the art can have the switch include other components as desired, for example one or more lenses, mirrors, optical fibers, and the like.

It is further contemplated that the above-described metasurface would be useful for other optical applications, for example as a meta-lens.

Concluding Remarks

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

REFERENCES

1. Fontana, J. P., *Self-assembly and characterization of anisotropic metamaterials*. 2011, Kent State University. p. 162.
2. Zhang, X. and Z. W. Liu, *Superlenses to overcome the diffraction limit. Nature Materials,* 2008. 7(6).
3. Smolyaninov, *Transformational optics of plasmonic metamaterials.* New Journal of Physics, 2008. 10.
4. Veselago, G. and E. E. Narimanov, *The left hand of brightness: past, present and future of negative index materials.* Nature Materials, 2006. 5(10): p. 759-762.
5. Engheta, N. and A. Alu, *The quest for magnetic plasmons at optical frequencies.* Optics Express, 2009. 17(7): p. 5723-5730.
6. Caldwell, J. D., et al., *Plasmonic Nanopillar Arrays for Large-Area, High-Enhancement Surface-Enhanced Raman Scattering Sensors.* Acs Nano, 2011. 5(5): p. 4046-4055.
7. Saxe, R. L., *Anisometrically shaped metal particles, liquid suspensions and films thereof and light valves comprising same.* 2003, Research Frontiers Incorporated: USA.
8. Driscoll, T., et al., *Memory Metamaterials. Science,* 2009. 325(5947): p. 1518-1521.
9. Ahn, S. H. and L. J. Guo, *High-speed roll-to-roll nanoimprint lithography on flexible plastic substrates.* Advanced Materials, 2008. 20(11): p. 2044-+.
10. Engheta, N., *Circuits with light at nanoscales: Optical nanocircuits inspired by metamaterials.* Science, 2007. 317(5845): p. 1698-1702.
11. Quake, S. R. and A. Scherer, *From micro- to nanofabrication with soft materials.* Science, 2000. 290(5496): p. 1536-1540.
12. Sundaramurthy, A., et al., *Toward nanometer-scale optical photolithography: Utilizing the near-field of bowtie optical nanoantennas.* Nano Letters, 2006. 6(3): p. 355-360.
13. Shalaev, V. M., *Optical negative-index metamaterials.* Nature Photonics, 2007. 1(1): p. 41-48.
14. Sihvola, A., *Metamaterials: A Personal View.* Radioengineering, 2009. 18(2): p. 90-94.
15. Deng, T. and L. Smentkowski, *Method for forming nanoparticle films and application thereof.* 2007.
16. Jaeger, H. M., et al., *Kinetically driven self assembly of highly ordered nanoparticle monolayers.* Nature Materials, 2006. 5(4): p. 265-270.

17. Sastry, M. and K. S. Mayya, *A new technique for the spontaneous growth of colloidal nanoparticle superlattices.* Langmuir, 1999. 15(6): p. 1902-1904.
18. Shikhmurzaev, Y. D., *Capillary flows with forming interfaces.* 2008.
19. Spain, E. M., et al., *Marangoni flow of Ag nanoparticles from the fluid-fluid interface.* Journal of Physical Chemistry A, 2008. 112(39): p. 9318-9323.
20. Chaudhari, R. V., et al., *Benzene- and anthracene-mediated assembly of gold nanoparticles at the liquid-liquid interface.* Langmuir, 2002. 18(17): p. 6478-6483.
21. Phillips, J. P., et al., *Dispersion of Gold Nanoparticles in UV-Cured, Thiol-Ene Films by Precomplexation of Gold-Thiol.* Chemistry of Materials, 2008. 20(16): p. 5240-5245.
22. Bowman, C. N., C. E. Hoyle, and A. B. Lowe, *Thiol-click chemistry: a multifaceted toolbox for small molecule and polymer synthesis.* Chemical Society Reviews, 2010. 39(4): p. 1355-1387.

What is claimed is:

1. A method of optical switching comprising:
    passing a pump light and a probe light through at least one polarization controller and thence through one or more metasurfaces; and
    modulating the pump light at a time scale on the order of picoseconds or shorter, thereby causing the intensity of probe light passing through the metasurface to be switched at the same time scale,
    wherein each metasurface is a monolayer film comprising metallic nanoparticles having substantially uniform spacing over at least a one centimeter length scale.

2. The method of claim 1, wherein the pump light and probe light each pass through separate polarization controllers and then through a first wavelength division multiplexer before reaching the metasurface.

3. The method of claim 2, wherein light passing through the metasurface then passes through a second wavelength division multiplexer.

4. The method of claim 2, wherein said nanoparticles have surfaces covered with molecular ligands.

5. The method of claim 2, wherein said nanoparticles have consistent edge-to-edge particle spacing of less than one particle diameter.

6. The method of claim 2, wherein the metallic nanoparticles are crosslinked together.

7. The method of claim 2, wherein said nanoparticles are gold nanospheres.

8. The method of claim 2, said nanoparticles have spherical or rod-shaped geometry.

9. An optical switch comprising:
    a first input port configured to admit pump light;
    a second input port configured to admit probe light;
    at least one polarization controller configured to receive the pump and probe light from the input ports;
    at least one metasurface in the form of a monolayer film comprising metallic nanoparticles having substantially uniform spacing over at least a one centimeter length scale, configured to receive light from the polarization controller; and
    an output port configured to receive light from the metasurface.

10. The optical switch of claim 9, further comprising a first wavelength division multiplexer and said at least one polarization controllers includes at least two such controllers,
    wherein the switch is configured such that pump light and probe light each pass through separate polarization controllers and then through a first wavelength division multiplexer before reaching the metasurface.

11. The optical switch of claim 10, further comprising a second wavelength division multiplexer through which light passes after passing through the metasurface.

12. The optical switch of claim 9, wherein said nanoparticles are gold nanospheres.

* * * * *